United States Patent
Tan et al.

(10) Patent No.: US 10,375,161 B1
(45) Date of Patent: Aug. 6, 2019

(54) DISTRIBUTED COMPUTING TASK MANAGEMENT SYSTEM AND METHOD

(71) Applicant: VCE Company, LLC, Richardson, TX (US)

(72) Inventors: Michael Tan, Palo Alto, CA (US); Akshaya Mahapatra, San Jose, CA (US)

(73) Assignee: VCE IP Holding Company LLC, Richardson, TX (US)

( * ) Notice: Subject to any disclaimer, the term of this patent is extended or adjusted under 35 U.S.C. 154(b) by 134 days.

(21) Appl. No.: 14/249,098

(22) Filed: Apr. 9, 2014

(51) Int. Cl.
| | | |
|---|---|---|
| *H04L 29/08* | (2006.01) | |
| *G06F 9/50* | (2006.01) | |
| *H04L 12/801* | (2013.01) | |
| *G06F 9/455* | (2018.01) | |
| *G06F 9/38* | (2018.01) | |

(52) U.S. Cl.
CPC ........ *H04L 67/1029* (2013.01); *G06F 9/5061* (2013.01); *G06F 9/5066* (2013.01); *H04L 47/11* (2013.01); *G06F 9/38* (2013.01); *G06F 9/455* (2013.01)

(58) Field of Classification Search
CPC .... G06F 9/505; G06F 9/45533; G06F 9/5083; G06F 2009/4557; G06F 2009/45583; H04L 67/1008
See application file for complete search history.

(56) References Cited

U.S. PATENT DOCUMENTS

| | | | |
|---|---|---|---|
| 5,838,968 A * | 11/1998 | Culbert | G06F 9/5011 718/103 |
| 8,706,798 B1 * | 4/2014 | Suchter | G06F 9/5038 709/202 |
| 9,306,870 B1 * | 4/2016 | Klein | H04L 29/06176 |
| 2008/0091806 A1 * | 4/2008 | Shen | G06F 9/5061 709/223 |
| 2010/0017515 A1 * | 1/2010 | Nishiguchi | G06F 9/5077 709/226 |
| 2013/0103817 A1 * | 4/2013 | Koponen | G06F 9/45558 709/223 |
| 2013/0290957 A1 * | 10/2013 | Li | G06F 9/5066 718/1 |
| 2014/0215076 A1 * | 7/2014 | Grothues | G06F 9/455 709/226 |
| 2014/0317265 A1 * | 10/2014 | James | H04L 67/1004 709/224 |
| 2015/0074672 A1 * | 3/2015 | Yeddanapudi | H04L 47/11 718/103 |
| 2015/0234668 A1 * | 8/2015 | Ravinoothala | G06F 9/45558 718/1 |
| 2016/0203026 A1 * | 7/2016 | Simitsis | G06F 9/38 718/104 |

* cited by examiner

*Primary Examiner* — Barbara B Anyan
(74) *Attorney, Agent, or Firm* — Polsinelli PC

(57) ABSTRACT

A distributed computing task management system includes an application for monitoring a processing load of multiple resources that are used to execute a distributed computing task. The resources include at least one hardware resource and one or more virtual objects executed on the hardware resources in a virtual computing environment. Using the monitored processing load, the application adjusts a performance of the resources to compensate for changes in the processing load incurred by the resources due to execution of the distributed computing task.

20 Claims, 6 Drawing Sheets

DISTRIBUTED COMPUTING TASK MANAGEMENT SYSTEM AND METHOD

TECHNICAL FIELD

Aspects of the present disclosure relate to computing devices and, in particular, to a distributed computing task management system and method.

BACKGROUND

The advent of large networked computing systems has enabled the storage and access to large amounts of data. For example, the advent of the Internet has provided a publicly accessible means for accessing large amounts of diverse information for many users. To handle these large amounts of data, distributed file systems have been developed. Distributed file systems, as opposed to localized file systems that store and access data at block levels, generally include multiple storage nodes that communicate with clients that access the data using a networking protocol, such as an Ethernet protocol.

SUMMARY

According to one aspect of the present disclosure, a distributed computing task management system includes an application for monitoring a processing load of multiple resources that are used to execute a distributed computing task. The resources include at least one hardware resource and one or more virtual objects executed on the hardware resources in a virtual computing environment. Using the monitored processing load, the application adjusts a performance of the resources to compensate for changes in the processing load incurred by the resources due to execution of the distributed computing task.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

DETAILED DESCRIPTION

Embodiments of the present disclosure provide a system for adjusting multiple resources of a distributed computing system to compensate for changes in a processing load incurred by the resources. Distributed computing systems are well adapted for performing distributed computing tasks that typically process large amounts of data. Nevertheless, uneven processing load is often incurred by each resource during operation of these distributed computing tasks. Embodiments of the distributed computing task management system and method described herein monitor the processing load of each resource and adjusts the resources' performance to compensate for changes in the resources such that optimal performance is obtained.

Figure 1:
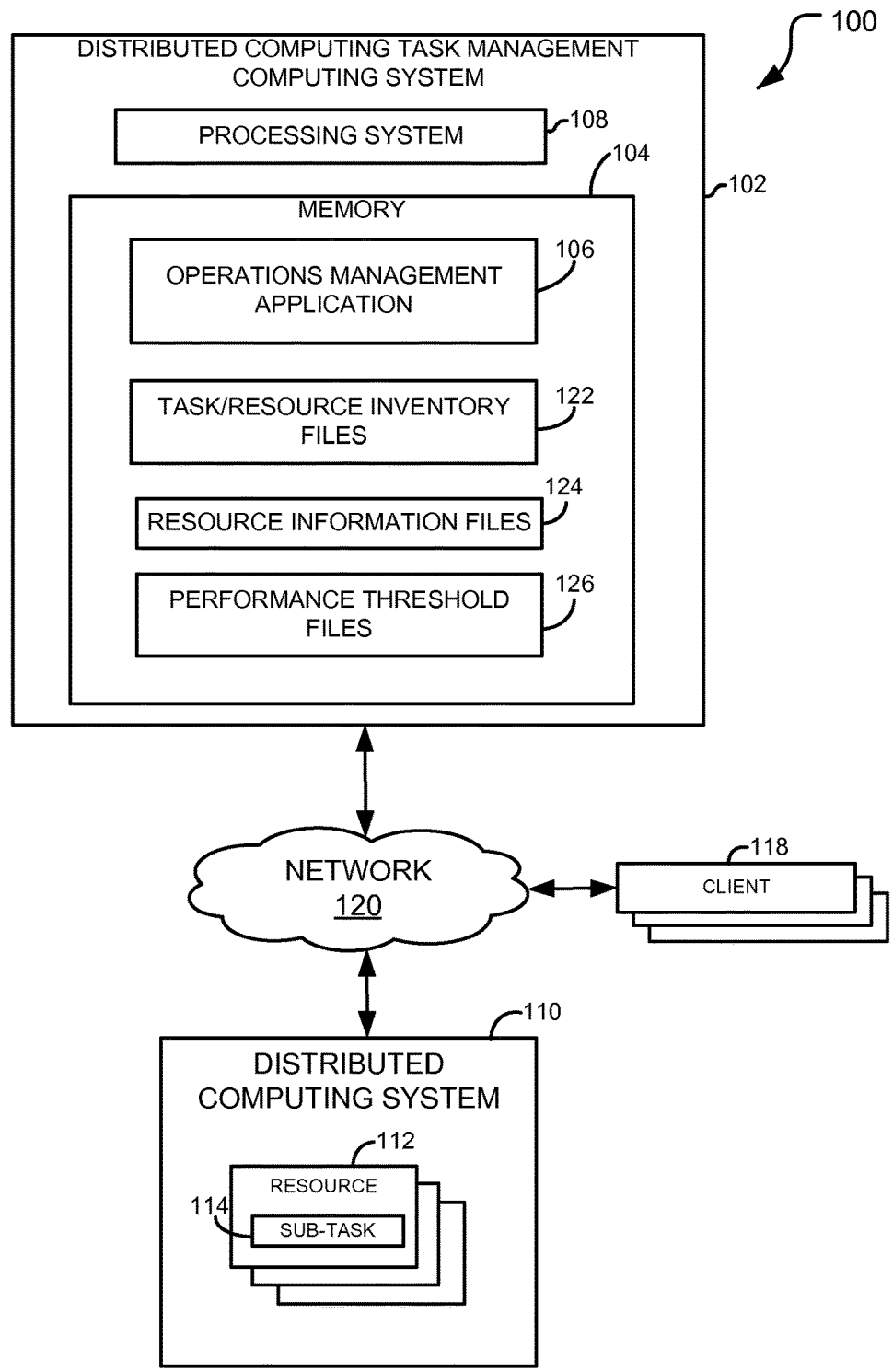
FIG. 1 illustrates an example distributed computing task management system according to one embodiment of the present disclosure.

FIG. 1 illustrates an example distributed computing task management system 100 according to the teachings of the present disclosure. The system 100 includes a distributed computing task management computing system 102 having a memory 104 for storing an operations management application 106 that is executed by a processing system 108. The operations management application 106 communicates with a distributed computing system 110 to manage multiple resources 112 of the distributed computing system that perform a distributed computing task made up of multiple sub-tasks 114. As will be described in detail below, the operations management application 106 monitors the processing load of each resource and adjusts the performance of each resource 112 to compensate for changes in the performance of each resource.

In general, conventional distributed computing systems that process distributed computing tasks with large amounts of data are limited in their performance due to several factors. First, the processing requirements of each sub-task 114 of a distributed computing task are not similar to one another. For example, while some sub-tasks 114 may be memory intensive, other sub-tasks 114 are computationally intensive, or inter-resource communication (e.g., input/output (I/O)) intensive. Second, conventional distributed computing systems, such as computer clusters, typically include a fixed quantity of resources (e.g., networked group of computing devices) the quantities of which cannot be increased or decreased on-demand. Additionally, the computing devices used in these conventional computing clusters often include commodity devices whose performance is not easily adjusted according to changes in processing load. Third, certain sorting algorithms, such as those used with map-reduce distributed computing tasks, are most optimally achieved with a single resource having enhanced performance characteristics as opposed to multiple resources with relatively lower performance characteristics.

A conventional distributed computing system, for example, often performs a distributed computing task by allocating a specified quantity of resources using commodity hardware. For non-virtualized computing environments, such as computer clusters, those resources (e.g., hardware devices) allocated for data storage are often the same type of resources allocated for computationally intensive tasks. The conventional distributed computing system may also implement a distributed file system, such as a Hadoop distributed file system (HDFS) to store the data. In many cases, however, data stored in a particular resource may be required to move to another resource during operation if/when its data transfer rates to other resources becomes slow (e.g., bogged down). Nevertheless, use of this type of system does not optimally utilize the resources of the computing cluster in that some resources are under-utilized while other resources remain over-utilized. Additionally, the performance of each resource and the number of resources available for performing the distributed computing task are fixed and cannot be changed.

Embodiments of the present disclosure provide a solution to these problems, among others, using a distributed computing system 110 implemented in a virtual computing environment in which its resources 112 are adjustable, by the operations management application 106, to compensate for changes in processing load incurred by each resource 112. For example, virtual objects of a distributed computing system 110 implemented in a virtual computing environment may be uniquely tailored for each of their assigned sub-tasks 114. Additionally, data storage used by the virtual computing environment may be implemented as a network file system (NFS) or a Hadoop file system (HDFS). Since, in many cases, data storage implemented in a virtual computing environment is shared, moving a distributed computing task (e.g., job) between virtual objects oftentimes will not initiate a transfer of data stored in one node (e.g. resource) to that of another node. The operations management application 106 monitors each resource 112 of the distributed computing system 110 to determine its performance characteristics (e.g., computationally intensive, memory intensive, and/or data transfer intensive), and dynamically adjusts the virtual objects parameters based on the monitored performance characteristics. The operations management application 106 may also include a storage array manager to efficiently copy data from one virtual object (e.g., storage node) to another such that optimal throughput is obtained in certain embodiments.

The resources 112 of the distributed computing system 110 generally represent hardware resources and/or one or more virtual objects executed on those hardware resources, which may be implemented in a virtual computing environment. The virtual computing environment may be embodied in any computing system that provides virtualized components (virtual objects) executed on one or more physical hosts. Such a computing environment may be provided in whole or in part through a converged infrastructure. Converged infrastructures typically refer to computing systems implemented in a virtual computing environment that includes a structured combination of multiple virtual objects that are executed on independently functioning hardware resources commonly referred to as hosts. Distributed computing systems 110 implemented in a virtual computing environment may be advantageous in that they are dynamically configurable to continually adapt to ever changing requirements typically exhibited by modern distributed computing systems. Converged infrastructures may involve multiple computing components pre-integrated into an optimized computing solution. The computing components of a converged infrastructure solution may include servers, data storage components, networking equipment and software for managing the integrated components. To assist in the scalability, management and sharing of resources, particularly in large data center environments, converged infrastructures may involve a pool of server, storage and networking capacities, typically virtualized, that can shared by multiple applications.

In another aspect, the distributed computing system 110 comprises a combination of converged infrastructures configured in a cloud computing environment. While some examples disclosed herein reference converged infrastructures, also sometimes referred to as unified computing systems, fabric-based computing systems, and dynamic infrastructures, systems and method described herein may be applied to other computing environments.

Resources 112 of a converged infrastructure may include resources, such as data processing devices, data storage devices, servers, networking equipment, and/or other computing devices. A converged infrastructure includes a combination of these devices that are packaged and interconnected in a standardized manner for ease of maintenance and use. For example, a converged infrastructure 200 such as that shown in FIG. 2 includes components found in Vblock™ System infrastructure packages available from VCE, LLC, which is located in Richardson, Tex. Converged infrastructures are often implemented in environments where relatively high reliability and/or availability are desired, such as in an enterprise environment. Nevertheless, it is contemplated that any computing infrastructure, such as a computer cluster, computing grid, blade array, and/or other computing infrastructure may be configured using the teachings of the present disclosure.

The clients 118 generally refer to users of the distributed computing system 110. For example, one client 118 may include a computing system administered by a business institution that stores and accesses data stored in the distributed computing system 110. Each distributed computing system client 118 includes a processing system that executes instructions stored in a memory for performing the one or more features described herein.

The operations management application 106, the distributed computing system 110, and the clients 118 communicate with one another using a communications network 120. Nevertheless, the operations management application 106, the distributed computing system 110, and the clients 118 may communicate with one another in any suitable manner. For example, the management computing system 102 and the distributed computing system 110 communicate with each other using wireless, wired, and/or optical communications. In one embodiment, the distributed file system management computing system 102 and the converged infrastructure 200 communicates with one another using a communication network 120, such as the Internet, an intranet, or other wired and/or wireless communication networks. In another embodiment, the management computing system 102 and converged infrastructure 200 communicate with one another using any suitable protocol or messaging scheme. For example, these networks may communicate using a Hypertext Transfer Protocol (HTTP), extensible markup language (XML), extensible hypertext markup language (XHTML), or a Wireless Application Protocol (WAP) protocol. Other examples of communication protocols exist. For example, the distributed file system management computing system 102 and converged infrastructure 200 may communicate with one another without the use of a separate or a distinct network. Additionally, other embodiments contemplate that the modules employed by the operations management application 106 are executed by a computing device configured on the converged infrastructure 200.

The memory 118 also stores task/resource inventory files 122, resource information files 124, and performance threshold files 126 that are used by the operations management application 106. The task/resource inventory files 122 maintain information about which tasks are assigned to which resources 112 in the distributed computing system 110. For example, information associated with what type of resources and how many of these resources 112 are used to execute each sub-task performed by the distributed computing system 110. The resource information files 124 maintain information about various operating parameters of each resource used by the distributed computing system 110. The operating parameters may include, for example, an amount of memory, a type and number of processors, and a measured processing load value that is periodically obtained for each resource 112. The performance threshold files 126 maintain threshold information indicating upper and lower limits of processing load that, when exceeded, causes the operations management application 106 to adjust the performance of that resource 112.

Figure 2A:
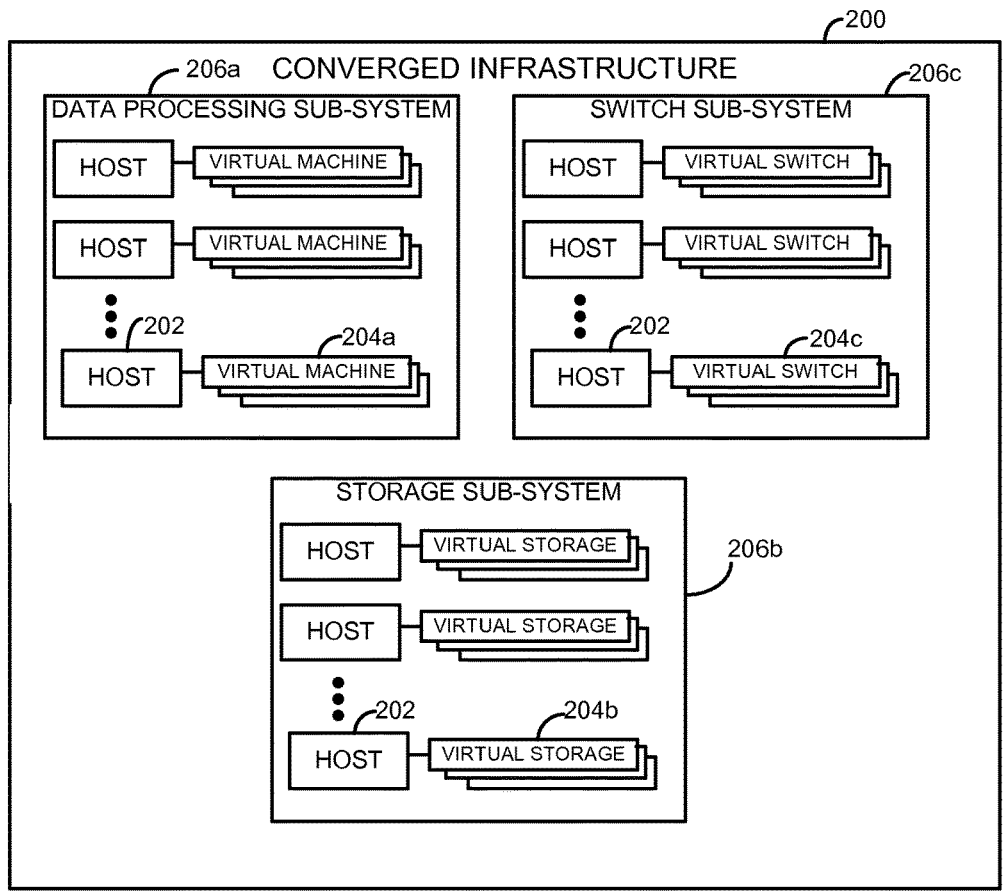
FIGS. 2A and 2B illustrate an example converged infrastructure that may be implemented as a distributed computing system according to one embodiment of the present disclosure.

FIG. 2A illustrates an example converged infrastructure 200 that may be implemented as a distributed computing system 110 according to the teachings of the present disclosure. The converged infrastructure 200 may be any type having multiple hosts 202 that each executes one or more virtual objects (e.g., virtual machines 204a, virtual storage objects 204b, and virtual switch objects 204c). The hosts of a converged infrastructure are often referred to as compute servers. Nevertheless, a 'host' may be any physical device and/or component that supports the operation of virtual resources and services provided by those virtual resources. The particular converged infrastructure 200 as shown includes several sub-systems, such as a data processing sub-system 206a, a data storage sub-system 206b, and a switch sub-system 206c. Nevertheless, it should be understood that other converged infrastructures 104 may include additional, fewer, or different types of sub-systems without departing from the spirit and scope of the present disclosure.

In one aspect, the data storage sub-system 206b includes computer-readable memory structures for storing data used by the converged infrastructure 200, which may include network attached storage (NAS) arrays and/or storage area network (SAN) arrays that are facilitated by multiple virtual objects (e.g., virtual storage objects 204b). The switch sub-system 206c provides for communication among the various sub-systems of the converged infrastructure 200, and may include components, such as fabric interconnect systems, Ethernet switches/routers, multilayer director switches (MDSs), and the like. The data processing sub-system 206a executes applications that access, store, and otherwise manipulate data stored by the converged infrastructure 200. For a particular example, either of the data storage sub-system 206b, the switch sub-system 206c, and/or the data processing sub-system 206a may comprise a blade computing platform having multiple hosts (e.g., blade computing devices) 106 that each executes one or more virtual objects.

Each sub-system includes multiple hosts 202 that each executes one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual architecture for each VM's operation and controls various aspects of their operation. One example of a suitable hypervisor includes the VMWARE ESX™ software suite that is available from VMware corporation, which is located in Palo Alto, Calif.

The operations management application 106 (FIG. 1) manages various activities of the distributed computing system 110 and may also manage operation of the hosts 202 and virtual objects 204 of the converged infrastructure 200. For example, the operations management application 106 manages the allocation and de-allocation of resources, such as hosts and virtual objects used by the system. Additionally, the operations management application 106 may manage the remediation of failures in the system by monitoring the health of each resource and performing corrective measures, such as migration (e.g., failover) to different resources in the event that certain resources have failed. The file system manager 108 may also control one or more aspects of the resources (e.g., hosts and virtual objects) used by the converged infrastructure 200. Any suitable type of file system manager may be implemented with the teachings of the present disclosure. In one embodiment, the system 100 includes a VSPHERE™ software suite that is available from VMware Corporation, which is located in Palo Alto, Calif.

Figure 2B:
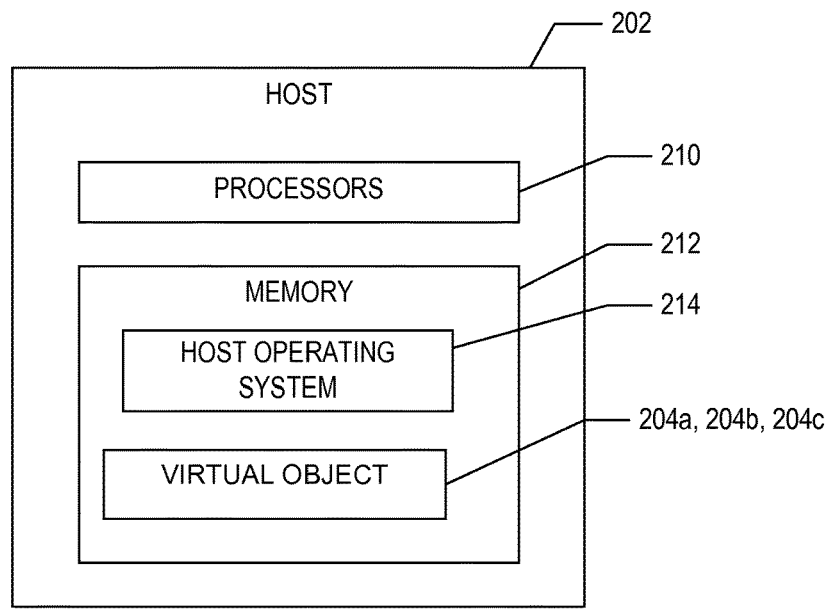

FIG. 2B illustrates an example host 202 implemented on each converged infrastructure 200 according to one aspect of the distributed computing task management system 100. The host 202 is a computing or processing device that includes one or more processors 210 and a memory 212. For example, the host 202 can be a personal computer, such as a laptop or notebook computer, a workstation, or other processing device such as a personal digital assistant or a tablet computer. In a particular embodiment, the host 202 is a rack mounted host, such as blade host in which multiple blade hosts share a common backplane for communication with one another and for receiving power from a rack mounted power distribution unit. The memory 212 stores a host operating system 214 and one or more virtual objects (e.g., VMs 204a, virtual storage objects 204b, and virtual switch objects 204c) that are executed by the processor 210. The host operating system 212 controls and manages the operation of the virtual objects executed on the host 202. For example, control signaling for starting, stopping, and/or changing operating parameters of each virtual object is managed through the host operating system 212.

Figure 3:
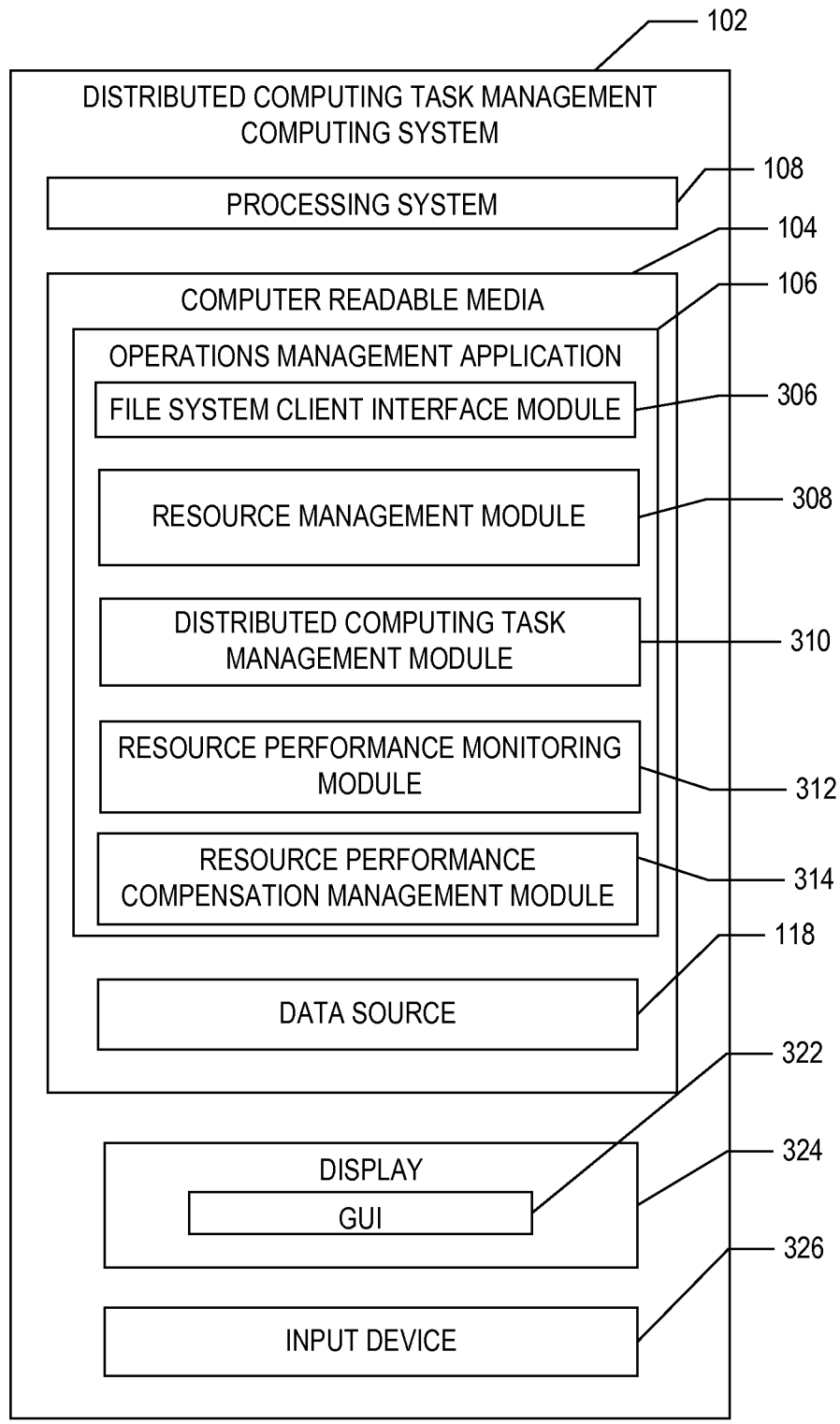
FIG. 3 illustrates a block diagram of an example operations management application executed on the distributed computing task management computing system according to one embodiment of the present disclosure.

Referring now in more detail to FIG. 3, a block diagram of an example operations management application 106 executed on the distributed file system management computing system 102, is depicted according to one aspect of the present disclosure. The operations management application 106 is stored in a memory 104 (computer readable media) and executed on a processing system 120 of the management computing system 102. The management computing system 102 may include any type of computing system, such as one or more management computing systems, personal computers, mobile computers and/or other mobile devices, and other hosts.

According to one aspect, the distributed file system management computing system 102 also includes a graphical user interface (GUI) 322 displayed on the display 324, such as a computer monitor, for displaying data. The distributed file system management computing system 102 also includes an input device 326, such as a keyboard or a pointing device (e.g., a mouse, trackball, pen, or touch screen) to enter data into or interact with the GUI 322. According to one aspect, the operations management application 106 includes instructions or modules that are executable by the processing system 302 as will be described in detail herein below.

The memory 104 includes volatile media, nonvolatile media, removable media, non-removable media, and/or another available medium. By way of example and not limitation, non-transitory computer readable medium comprises computer storage media, such as non-transient storage memory, volatile media, nonvolatile media, removable media, and/or non-removable media implemented in a method or technology for storage of information, such as computer readable instructions, data structures, program modules, or other data.

A distributed computing system client interface module 306 facilitates the receipt of input data and/or output data from or to a client, respectively. In one example, the distributed computing system client interface module 306 receives requests to perform distributed computing tasks (e.g., jobs) from one or more clients 118 and communicates with the other modules of the operations management application 106 to service those requests. Additionally, the distributed computing system client interface module 306 also facilitates receipt of data from the client 118 to store the received data for further processing by the operations management application 106.

A manual resource management module 308 manages one or more operating parameters of the resources (e.g., hosts and virtual objects) of the virtual computing environment. For example, the resource management module 308 receives requests from a user of the distributed computing system 110, such as an administrator responsible for its operation, and perform various operations on the distributed computing system 110 according to those requests, such as allocation or de-allocation of resources used in the distributed computing system 110, establishment of one or more sub-networks or other communication links in the distributed computing system 110, migration of services executed by certain resources to other resources in the distributed computing system 110, and the like.

A distributed computing task management module 310 manages the receipt of requests for performing distributed computing tasks from the distributed computing system clients 118 and facilitates execution of the distributed computing tasks in response to those requests. For example the distributed computing task management module 310 may receive a request to perform a distributed computing task from a client 118 that may include certain criteria to be associated with the distributed computing task, delineate the distributed computing task into multiple sub-tasks 114, facilitate execution of each sub-task on a resource 112, and perform any communication necessary with the distributed computing system client 118, such as the transmission of one or more handshake notifications, to consummate the execution of the requested distributed computing task with the distributed computing system client. Additionally, the distributed computing task management module 310 may also issue one or more other notification messages to the distributed computing system client indicating various aspects of the requests distributed computing task, such as an expected time to completion of the distributed computing task, and/or performance information associated with the operation of the distributed computing task on the distributed computing system 110.

A resource performance monitoring module 312 monitors the performance of the resources used to perform the sub-tasks 114 of the distributed computing task. For example, the resource performance monitoring module 312 may monitor the performance of each resource by communicating with an application, such as a task manager that continually monitors processing load and memory usage, to obtain performance characteristics of each resource. As another example, the resource performance monitoring module 314 may monitor an elapsed job completion time required for completion of certain sub-tasks performed by each resource to determine its throughput rate in which the throughput rate is estimated to be representative of a processing load of that resource. As yet another example, the resource performance monitoring module 312 may monitor a network analyzer, such as a sniffer device, to measure a throughput rate of data on a communication link to estimate a processing load for resources that use that communication link.

In one embodiment, the resource performance monitoring module 314 determines a type of processing load incurred on each resource. The resource performance monitoring module 312 may determine, using the devices described herein above, whether the loading is memory intensive, computationally intensive, and/or inter-resource communication loading level (e.g., input/output (I/O)) intensive. That is, the resource performance monitoring module 312 may ascertain a level of memory usage, a computational loading level, and/or an inter-resource communication loading level of each resource.

All processing load incurred by the resources of the system is not similar. For example, whereas a virtual storage unit typically exhibits large levels of memory loading, it does not often become computationally intensive. Conversely, a virtual machine may exhibit large computational loading levels, it does not often incur large levels of memory loading. Thus, embodiments of the present disclosure provide a solution to this problem by determining, for each resource, a type of loading incurred by that resource and adjusts the performance of that resource according to the type of processing load incurred on that resource.

A resource performance compensation management module 314 adjusts the performance of the resources in response to changes in the processing load of each resource. For example, the resource performance compensation management module 314 receives measured performance values from the resource performance compensation management module 314 and adjusts the performance of the resources to compensate for the changes in processing load. In one aspect, the resource performance compensation management module 314 compares the received measured performance values for a particular resource with one or more threshold values stored in the memory 126 and increases the performance of that particular resource when the processing load exceed an upper limit and decreases the performance of that particular resource when the processing loads goes below another lower limit.

The performance level of the resources may be adjusted in any suitable manner. For example, a virtual object of a distributed computing system 110 may be adjusted by adding one or more virtual processors and/or virtual memory when processing load increases and deleting one or more virtual processors and/or virtual memory when the processing load decreases. As another example, the resource performance compensation management module 314 may adjust the performance level of the resources by the allocation or de-allocation of additional resources to a group of resources assigned to a particular task or sub-task of the distributed computing task. Given an example in which five resources have been assigned to perform a certain task of the distributed computing task, the resource performance compensation management module 314 may allocate another resource to the group to form a group of six virtual objects assigned to performing that task. Conversely, the resource performance compensation management module 314 may de-allocate a resource from the group to form a group of four resources when the processing load of the resources of the group goes down. The resources may include hardware resources (e.g., hosts) and/or software resources (e.g., virtual objects) of the distributed computing task. In certain embodiments, the resource performance compensation management module 314 may allocate or de-allocate a combination of hardware resources and software resource to compensate for the change in processing load of each resource.

In one embodiment, the resource performance compensation management module 314 adjusts the performance of each resource according to a type of processing load incurred on that resource. For example, if it is determined that a particular virtual resource is exhibiting a large level of computational loading, the resource performance compensation management module 314 may add one or more additional virtual processors to be used by that virtual resource. As another example, if it is determined that a particular virtual resource is exhibiting a large level of memory usage, the resource performance compensation management module 314 may allocate additional virtual memory to that virtual resource. As yet another example, if it is determined that a particular virtual resource is exhibiting a large level of I/O loading, the resource performance compensation management module 314 may allocate additional ports and/or bandwidth to those communication links that service the virtual resource.

It should be appreciated that the modules described herein are provided only as examples, and that the operations management application 106 may have different modules, additional modules, or fewer modules than those described herein. For example, one or more modules as described in FIG. 3 may be combined into a single module. As another example, certain modules described herein may be encoded on, and executed on other computing systems, such as on one of the hosts 202 of a converged infrastructure 200 as described above with reference to FIGS. 2A and 2B.

Figure 4:
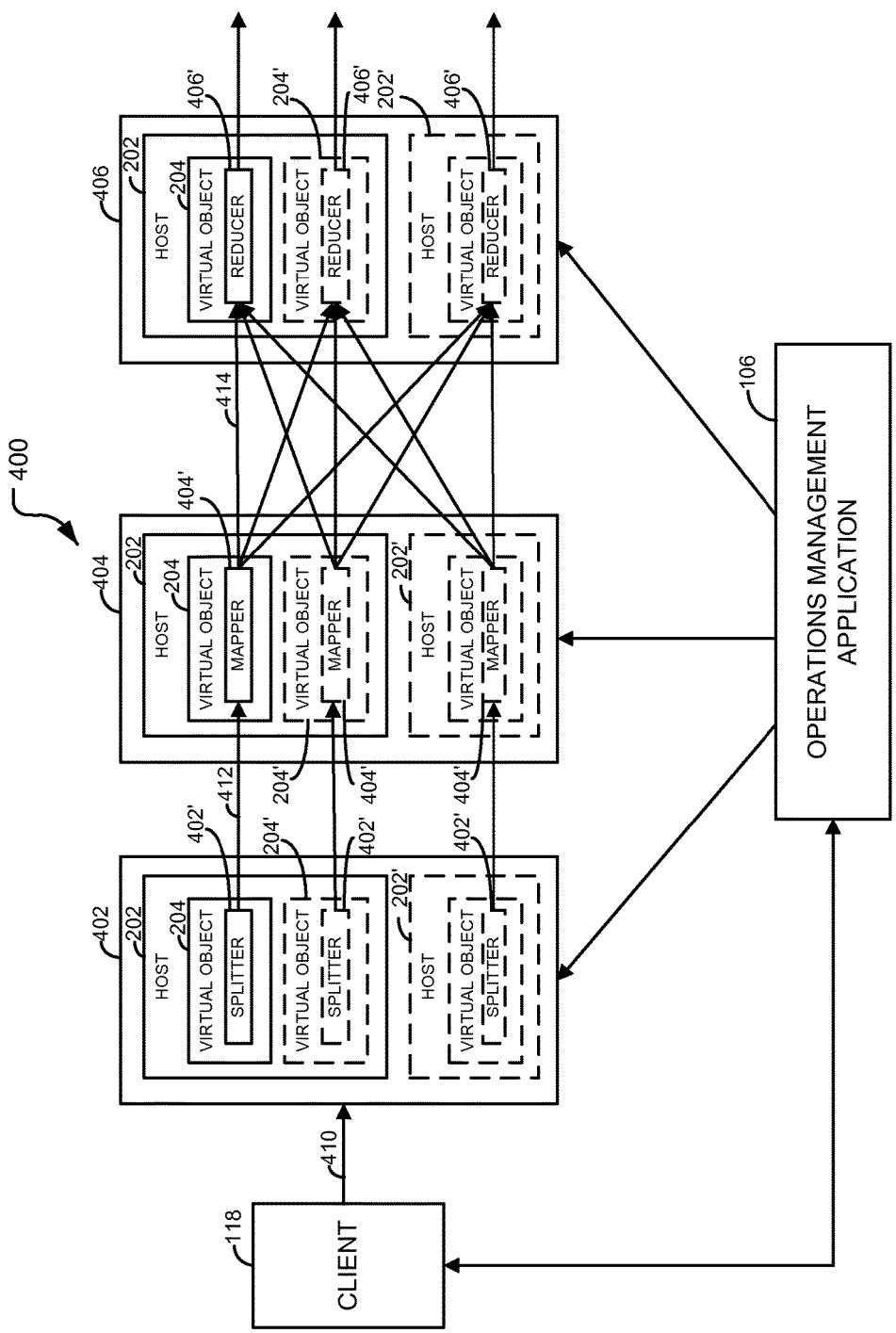
FIG. 4 illustrates an example distributed computing task that may be performed by the distributed computing system according to one embodiment of the present disclosure.

FIG. 4 illustrates an example distributed computing task that may be managed by the operations management application 106 according to one embodiment of the present disclosure. The particular distributed computing task generally includes a map-reduce process 400 in which relatively large amount of data throughput may be provided using a parallel processing technique; nevertheless, it should be understood that other types of distributed computing tasks may be managed by the operations management application 106 according to the teachings of the present disclosure.

The map-reduce process 400 generally includes a splitting process 402, a mapping process 404, and a reducing process 406. The splitting process 402 is performed by multiple sub-tasks referred to as splitters 402', whereas the mapping process 404 is performed by a corresponding multiple number of sub-tasks referred to as mappers 404'. The reducing process 406 is performed by one or more sub-tasks referred to as reducers 406' that may be similar in number to, or fewer in number than those used for the splitting process 402 and mapping process 404.

Each splitter 402', mapper 404', and reducer 406' may be embodied on a virtual object 204 that may be, for example, a virtual machine of a virtual computing environment, such as a converged infrastructure or a cloud computing environment. As shown, a separate virtual object 204 is allocated for each splitter 402', mapper 404', and reducer 406'. Nevertheless a specified combination of splitters 402', mappers 404', and reducers 406' may be executed on each virtual machine. For example, one virtual machine may be allocated to execute one splitter 402', one mapper 404', and one reducer 406'.

Generally, each splitter 402' functions to split or organize a data stream 410 provided by a distributed computing system client 118 into multiple data streams 412 which are subsequently provided to the mappers 404'. Each mapper applies a mapping function to its respective data stream and supplies the mapped data streams 414 to the reducers 406'. Each reducer 406' mixes and/or recombines the data according to a specified operation requested by the client 118. For example, the operations management application 106 may receive a search request from the client 118 indicating certain keywords or criteria from which to aggregate data in the data streams matching those keywords or criteria. The resulting aggregated data from the reducers 406' are then outputted for the distributed computing system client 118 by the system 100.

The operations management application 106 manages when and how the virtual objects that execute the splitters 402', mappers 404', and reducers 406' are instantiated, adjusted, or deleted. For example, the operations management application 106 may add an additional virtual object 204', 204', and/or 204' to execute an additional splitter 402', mapper 404', or reducer 406', respectively, when demand upon the distributed computing system 110 increases, and alternatively, delete the virtual object 204', 204', and/or 204' and its associated splitter 402', mapper 404', or reducer 406', respectively, when demand upon the distributed computing system 110 decreases. As another example, the operations management application 106 may add an additional host 202' to execute a corresponding additional virtual object and associated splitter 402', mapper 404', or reducer 406', respectively, when demand upon the map-reduce process increases, and alternatively, delete the host 202' and its corresponding virtual object, respectively, when demand upon the distributed computing system 110 decreases.

In other embodiments, the performance of each virtual object may be adjusted to compensate for changes in processing load according to a type of processing load exhibited on that resource. For example, the virtual object 204 executing a splitter 402' may be modified by the operations management application 106 to increase/decrease the number of virtual processors and/or increase/decrease the amount of virtual memory according to changes in computational loading and/or memory usage, respectively, incurred on the virtual object executing the splitter.

Although embodiments of the operations management application 106 according to the teachings of the present disclosure have been described herein for use with a map-reduce process, other embodiments contemplate that other parallel processes using distributed memory architectures may also benefit from the efficient storage and access to stored data provided by the system 100. For example, embodiments of the present disclosure may perform a data warehousing process for storage of large amounts of data, such as that which may be used by a video service provider.

Figure 5:
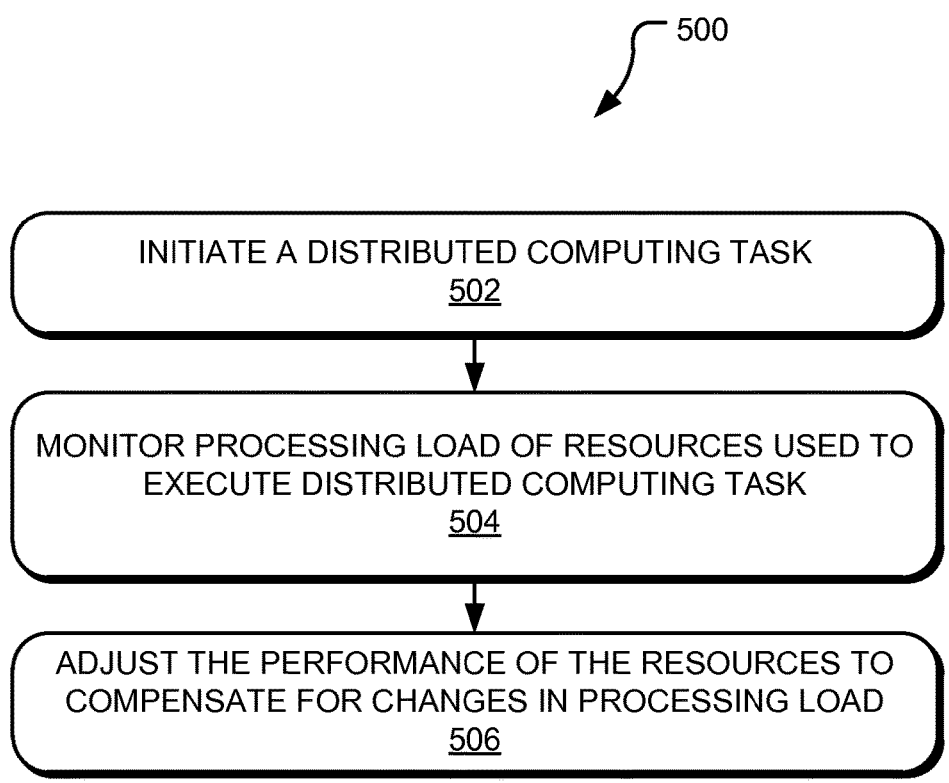
FIG. 5 illustrates an example process that is performed by the operations management application according to one embodiment of the present disclosure.

FIG. 5 illustrates an example process 500 that is performed by the operations management application 106 to manage the performance of resources of a distributed computing system to compensate for changes in the processing load incurred by each resource according to one embodiment of the present disclosure.

In step 502, the operations management application 106 initiates execution of a distributed computing task on the distributed computing system 110. In one embodiment, the distributed computing task comprises a map-reduce HDFS process. In another embodiment, the distributed computing task is executed on distributed computing system 110 implemented in a virtual computing environment, such as a converged infrastructure or a cloud computing environment comprising multiple converged infrastructures in communication with one another through a network.

In step 504, the operations management application 106 monitors a processing load of each resource used to execute the distributed computing task. In one aspect, the distributed computing system 110 is embodied in a virtual computing environment having multiple hardware elements (e.g., hosts) configured to each execute one or more virtual objects (e.g., virtual machines, virtual storage units, and/or virtual switches) in which each of the hosts and virtual objects comprise the resources of the distributed computing system 110.

The processing load may be monitored in any suitable manner. In one embodiment, the operations management application 106 monitors the performance of each resource by receiving processing load information from an application, such as a task manager, that continually monitors processing load and memory usage, to obtain performance characteristics of each resource. In another embodiment, the operations management application 106 monitors an elapsed job completion time of each sub-task executed by that resource to estimate the processing load on that resource. In yet another embodiment, the operations management application 106 monitors a communication link, such as a virtual sub-network to measure a throughput rate of data on that link to estimate a processing load for resources coupled to that link.

In step 506, the operations management application 106 adjusts the performance of the resources to compensate for changes in the processing load of the resources. For example, the performance of certain resources may be adjusted by adding or deleting additional resources as the processing load increases or decreases, respectively. As another example in which the resources comprises virtual objects of a virtual computing environment, the performance of the virtual objects may be adjusted by adding or deleting one or more virtual processors and/or one or more virtual memory units as the processing load on the virtual objects increases or decreases, respectively. Additionally, the operations management application 106 may the performance of hardware resources (e.g., hosts) may be adjusted by adding or deleting one or more additional hardware resources as the processing load on the virtual objects increases or decreases, respectively.

The previous steps may be repeatedly performed for continual management of distributed computing tasks performed by the distributed computing system 110 to compensate for changes in processing load to each resource 112 that executed the distributed computing task. Nevertheless, when use of the operations management application 106 is no longer needed or desired, the process ends.

Although FIG. 5 describes one example of a process that may be performed by the operations management application 106 to compensate for changes in processing load, the features of the disclosed process may be embodied in other specific forms without deviating from the spirit and scope of the present disclosure. For example, the operations management application 106 may perform additional, fewer, or different operations than those operations as described in the present example. As another example, the steps of the process described herein may be performed by a computing system other than the computing system 102, which may be, for example, one of the virtual objects executed on the virtual computing environment.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 6:
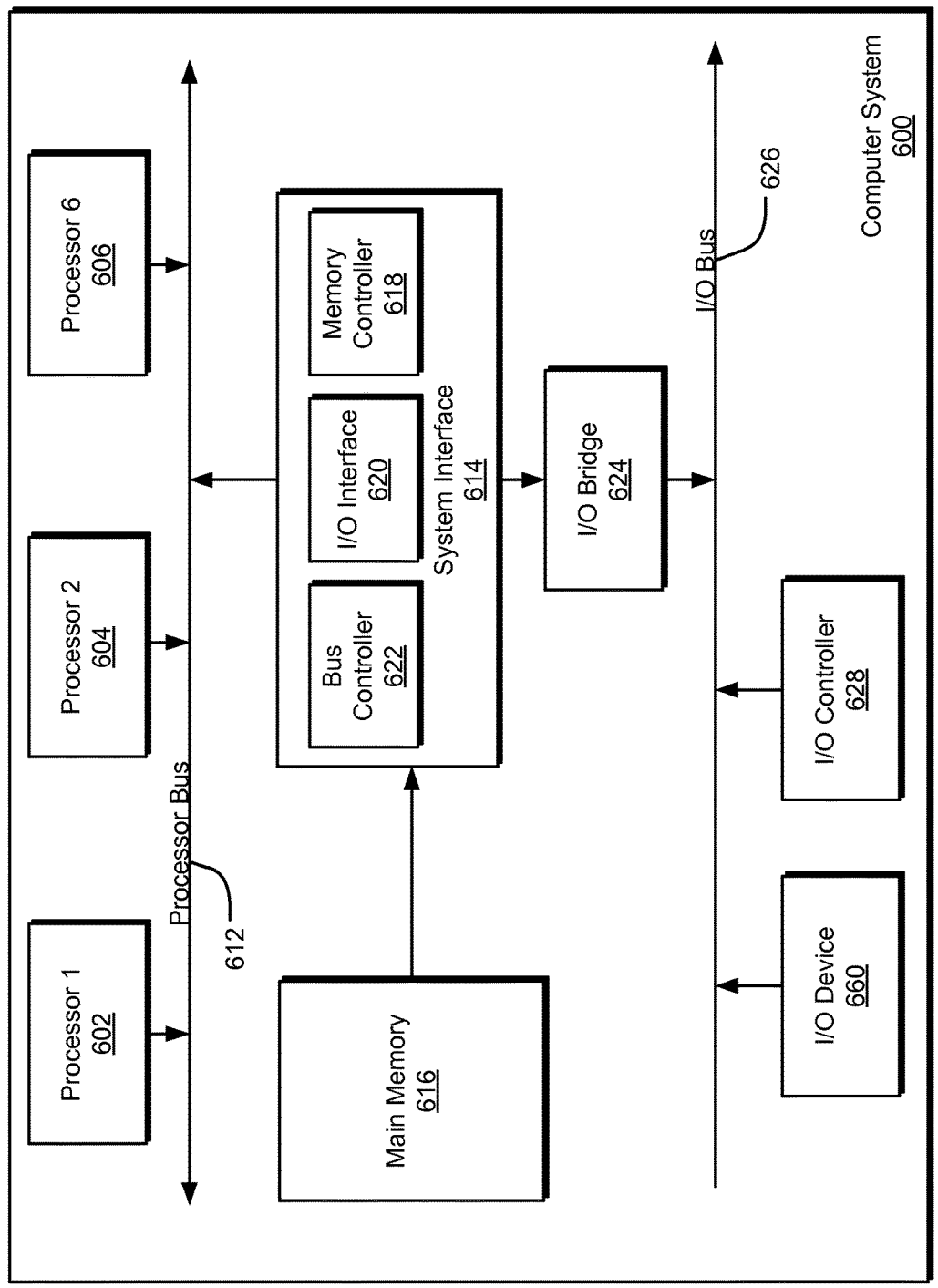
FIG. 6 illustrates an example computer system according to one embodiment of the present disclosure.

For example, FIG. 6 is a block diagram illustrating an example of a host or computer system 600 which may be used in implementing the embodiments of the present disclosure. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 613 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-

606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A distributed computing task management method comprising:
   monitoring, using an application stored in a non-transitory medium and executed on at least one processor, a processing load of a plurality of resources executing a map-reduce process comprising a plurality of splitter tasks, a plurality of mapper tasks, and a plurality of reducer tasks, the plurality of resources comprising at least one of a plurality of hardware resources and a plurality of virtual objects executed on the hardware resources in a virtual computing environment, wherein each of the plurality of splitter tasks, the plurality of mapper tasks, and the plurality of reducer tasks are executed on individual ones of the virtual objects in the virtual computing environment;
   determining, while the map-reduce process continues to execute on the plurality of resources, performance characteristics of the plurality of resources, the performance characteristics comprising one or more of:
   a type of processing load being executed by the plurality of resources; and
   a change in the processing load being incurred by the plurality of resources; and
   adjusting, using the application executed by the processor and while the map-reduce process continues to execute, a quantity of the plurality of resources used to execute the map-reduce process, the adjusting based on the performance characteristics of the plurality of resources.

2. The method of claim 1, wherein the type of processing load being executed comprises at least one of a memory usage of the plurality of resources, a computational loading level of the plurality of resources, and an inter-resource communication loading level of the plurality of resources.

3. The method of claim 1, further comprising monitoring at least one of a job completion time of the map-reduce process executed on each resource, a processing load level of a processor unit used by the plurality of resources, and a memory usage level of a memory unit used by each of the plurality of resources.

4. The method of claim 1, further comprising adjusting a performance of the plurality of resources by instantiating one or more additional virtual objects when the processing load meets a specified first level or deleting one or more of the plurality of virtual objects when the processing load meets a specified second level, the virtual objects comprising the at least one or more of the plurality of resources.

5. The method of claim 1, further comprising adjusting the quantity of the plurality of resources by enhancing one or more performance characteristics of at least one of the plurality of resources when the processing load of the at least one resource meets a specified first level or reducing the one or more performance characteristics of the at least one resource when the processing load meets a specified second level.

6. The method of claim 5, wherein the one or more performance characteristics comprise at least one of a number of processors allocated to at least one of the plurality of resources and an amount of memory allocated to at least one of the plurality of resources.

7. The method of claim 1, further comprising adjusting the quantity of the plurality of resources by allocating one or more additional hardware resources when the processing load meets a specified first level and de-allocating one or more previously allocated hardware resources when the processing load meets a specified second level, the hardware resources comprising the plurality of resources.

8. The method of claim 1, wherein the virtual computing environment includes at least one of a converged infrastructure and a cloud computing environment.

9. A distributed computing task management system comprising:
a computing system comprising at least one processor and at least one memory to store an application that is executed by the at least one processor to:
monitor a processing load of a plurality of resources executing a map-reduce process comprising a plurality of splitter tasks, a plurality of mapper tasks, and a plurality of reducer tasks, the resources comprising at least one of a plurality of hardware resources and a plurality of virtual objects executed on the hardware resources in a virtual computing environment, wherein each of the plurality of splitter tasks, the plurality of mapper tasks, and the plurality of reducer tasks are executed on individual ones of the virtual objects in the virtual computing environment;
determine, while the map-reduce process continues to execute on the plurality of resources, performance characteristics of the plurality of resources, the performance characteristics comprising one or more of:
a type of processing load being executed by the plurality of resources; and
a change in the processing load being incurred by the plurality of resources; and
adjust, while the map-reduce process continues to execute, a quantity of the resources used to execute the map-reduce process, the adjusting based on the performance characteristics of the plurality of resources.

10. The distributed computing task management system of claim 9, wherein the type of processing load being executed comprises at least one of a memory usage of the plurality of resources, a computational loading level of the plurality of resources, and an inter-resource communication loading level of the plurality of resources.

11. The distributed computing task management system of claim 9, wherein the application is further executed to monitor at least one of a job completion time of the map-reduce process executed on each of the plurality of resources, a processing load level of a processor unit used by the plurality of resources, and a memory usage level of a memory unit used by each of the plurality of resources.

12. The distributed computing task management system of claim 9, wherein the application is further executed to adjust a performance of the plurality of resources by instantiating one or more additional virtual objects when the processing load meets a specified first level or deleting one or more of the existing virtual objects when the processing load meets a specified second level, the virtual objects comprising the plurality of resources.

13. The distributed computing task management system of claim 9, wherein the application is further executed to adjust a performance of the plurality of resources by enhancing one or more performance characteristics of at least one of the plurality of resources when the processing load of the at least one resource meets a specified first level or reducing the one or more performance characteristics of the at least one resource when the processing load meets a specified second level.

14. The distributed computing task management system of claim 13, wherein the one or more performance characteristics comprise at least one of a number of processors allocated to at least one of the plurality of resources and an amount of memory allocated to the at least one resource.

15. The distributed computing task management system of claim 9, wherein the application is further executed to adjust the quantity of the plurality of resources by allocating one or more additional hardware resources when the processing load meets a specified first level and de-allocating one or more previously allocated hardware resources when the processing load meets a specified second level, the hardware resources comprising the plurality of resources.

16. The distributed computing task management system of claim 9, wherein the virtual computing environment includes at least one of a converged infrastructure and a cloud computing environment.

17. A non-transitory, computer readable medium including computer executable instructions that when executed by at least one processor are operable to:
monitor a processing load of a plurality of resources executing a map-reduce process comprising a plurality of splitter tasks, a plurality of mapper tasks, and a plurality of reducer tasks, the plurality of resources comprising at least one of a plurality of hardware resources and a plurality of virtual objects executed on the hardware resources in a virtual computing environment, wherein each of the plurality of splitter tasks, the plurality of mapper tasks, and the plurality of reducer tasks are executed on individual ones of the virtual objects in the virtual computing environment;
determine, while the map-reduce process continues to execute on the plurality of resources, performance characteristics of the plurality of resources, the performance characteristics comprising one or more of:
a type of processing load being executed by the plurality of resources; and
a change in the processing load being incurred by the plurality of resources; and
adjust, while the map-reduce process continues to execute, a quantity of the resources used to execute the map-reduce process, the adjusting based on the performance characteristics of the plurality of resources.

18. The non-transitory computer readable medium of claim 17, the computer executable instructions further operable to perform monitoring at least one of a job completion time of the map-reduce process executed on each resource of the plurality of resources, a processing load level of a processor unit used by the resource, and a memory usage level of a memory unit used by the resource.

19. The non-transitory computer readable medium of claim 17, the computer executable instructions further operable to perform adjusting a performance of the plurality of resources by instantiating one or more additional virtual objects when the processing load meets a specified first level or deleting one or more of the existing virtual objects when the processing load meets a specified second level, the virtual objects comprising the resources.

20. The non-transitory computer readable medium of claim 17, the computer executable instructions further operable to perform adjusting a performance of the plurality of resources by enhancing one or more performance characteristics of at least one of the plurality of resources when the processing load of the at least one resource meets a specified first level or reducing the one or more performance characteristics of the at least one resource when the processing load meets a specified second level.

\* \* \* \* \*